United States Patent [19]

Ching

[11] Patent Number: 5,485,601
[45] Date of Patent: Jan. 16, 1996

[54] COMPLETELY AUTOMATED AND SELF-GENERATING SOFTWARE SYSTEM

[76] Inventor: Hugh Ching, P.O. Box 461, Berkeley, Calif. 94701

[21] Appl. No.: 232,450

[22] Filed: Apr. 21, 1994

Related U.S. Application Data

[63] Continuation-in-part of Ser. No. 882,672, May 14, 1992, abandoned.

[51] Int. Cl.$^6$ ................................................. G06F 17/50
[52] U.S. Cl. ............................................ 395/500; 395/700
[58] Field of Search ............................ 395/12, 922, 500, 395/700

[56] References Cited

U.S. PATENT DOCUMENTS

| | | | |
|---|---|---|---|
| 4,841,441 | 6/1989 | Nixon et al. | 395/922 |
| 5,038,296 | 8/1991 | Sano | 395/922 |
| 5,084,813 | 1/1992 | Ono | 395/922 |
| 5,159,687 | 10/1992 | Richburg | 395/922 |
| 5,216,592 | 6/1993 | Mann et al. | 395/922 |

OTHER PUBLICATIONS

Fischer et al., "Knowledge–Based Spreadsheets," Proceedings AAAI–88, Aug. 21–26, 1988, pp. 802–807.
Kaiser et al., "Intelligent Assistance for Software Development and Maintenance," IEEE Software, 1988, pp. 40–49.

*Primary Examiner*—William M. Treat
*Assistant Examiner*—Richard L. Ellis

[57] ABSTRACT

A completely automated software, firmware, and/or hardware system capable of self-generation and auto-updating, designed to be independent of computer technology and to never become obsolete as computer technology changes. A system in which all the software programs are generated by feeding problem specification files, which can be handled automatically, and, thus, can be updated and documented by, the computer, into program generators, which communicate with users in human language. The initial self-generating generators which have their own specification files and can, therefore, generate themselves. A self-generating software system or cell, which will enable multicellular designs using external common files, comprises (1) programs; (2) generators; (3) specification files, which are the recordings of the exact keystrokes in answering tree-structured multiple-choice and text questions posed by specification generators; and (4) full sets of subroutines, which are produced automatically, can generate instructions, can document and update specifications, and can be transported from generators to generators by selective copying, chaining, and/or merging. By following the flow of the tree-structured multiple-choice questions, a user no longer needs to commit to memory any technical information, such as addresses, formats, keywords, etc. In particular, by presetting a flag in the program generator, not only can the generator generate instructions, but it can also generate instructions which can generate instructions, thus, allowing future generated generators to generate instructions, and also instruction generating instructions. The self-generating software system is completely automated, can self-generate to infinity, and has a structure similar to the DNA-protein system of the living organism.

4 Claims, 4 Drawing Sheets

| = | | NUMBERED WINDOWS | | 41 | | < | > |
|---|---|---|---|---|---|---|---|
| SSS1 | RECORDING SPECIFICATONS: 42 | | YES | NO | FILENAME: DEMO | | |
| 1. A-H | 2. I-L | 3. M-R | 4. S-Z 43 | 5. SET FLAGS | | 6. EXIT | |
| | | 1. M-N | | | | | |
| | | 2. O-P 44 | 1. ON | | | | |
| | | 3. Q-R | 2. OPEN | | | | |
| | | | 3. PRINT STRING 45 | | | | |
| | | | 4. PRINT VARIABLES | | | | |

| ACTION BOX | |
|---|---|
| INPUT VARIABLE NAME ? | 46 |
| X | |

| SPECIFICATIONS: 47 | 234 | 241FILE1 | 242FILE2 | 324X | |
|---|---|---|---|---|---|
| A=AUTO   B=BACKSPACE   INS=INSERT   DEL=DELETE   ?=HELP | | | | | ∧ |
| F1=QUIT AUTO   J-JUMP   ESC=QUIT | | | 48 | | ∨ |

FIGURE 4

COMPLETELY AUTOMATED AND SELF-GENERATING SOFTWARE SYSTEM

This is a continuation of application Ser. No. 07/882,672, filed 1992 May 14.

This is a continuation-in-part application of Ser. No. 07/882,672, filed May 14, 1992, now abandoned.

BACKGROUND OF THE INVENTION

1. Field of the Invention

The present invention deals with a computing device or system. In particular, it deals with a completely automated software system, or any device of the same principle. In practice, through self-generation and automatic updating from old to new versions, the software systems in this invention can become independent of computer technology and, thus, will never become obsolete when the technology changes. Henceforth, we shall use software, software program or software system to mean device or system made of software, firmware, and/or hardware.

2. Background of the Invention

Currently, software programs are dependent on computer technology. When the computer hardware system, the operating system, and/or the computer language change, the software programs written under these systems often become obsolete. In general, all today's software programs sooner or later will become obsolete, for computer technology will surely continue to change. Because designers of software systems in the past did not or could not take into consideration the future upgrading of software, today there is a crisis of software maintenance, in which most of the money and energy for software (as high as 80% of the total budget) is spent on updating and maintaining old software. And, the closer a software system is to obsolescence, the costlier it is to be maintained. The situation can only get worse. It should also be noted that upgrading from one technology-dependent software system to another technology-dependent system is not the correct solution for software.

Furthermore, in order to use a computer, an end-user or a software developer has to learn the necessary computer language and technologies, which create a barrier between people and the computer. This invention intends to eliminate technical information in computer usage and to make the communication between the computer and its users, including all software developers and hardware designers, exclusively in human languages. This software system becomes independent of technology through self-generation and auto-updating. Auto-updating allows a system, in principle, to be upgraded to systems of virtually unlimited complexity, such as those needed to sustain evolutionary life.

The main purpose of the computer and its software is to automate and speed up manual processes. However, computerization generally can only achieve partial automation. From a theoretical point of view, this invention is designed to be a completely automated software system and is conceptually closer to the living organism, which is totally automated, than to the non-living technology of the twentieth century, even though this invention is discovered for software independent of the structure of the living organism. This invention could provide a new and common foundation for computer science and theoretical biology.

The fundamental concept of this invention is that although no material device can last forever without deterioration, information through automatic regeneration is theoretically possible to exist unaltered permanently as exemplified by the propagation of DNA in living organisms. Thus, the primary concern of this invention is to achieve full and complete automation in an information system consisting of computer software.

This invention proposes to create an information system in the form of software intended to last to infinity, even with the possibility of evolutionary changes. Not only is it true that such a permanent system cannot be experimentally tested, it faces the added difficulty that mistakes or bugs in the system may have to be traced back to the infinite past. A prime example relating to infinity in time is the study of the evolution and the origin of life. From a theoretical point of view, life can be defined as information stored in a permanent format or simply as permanent information.

Accordingly, this invention is beyond the field of knowledge covered by physical science, which generally studies physical phenomena occurring within finite time intervals and, therefore, can rely largely on experimentation and empirical verification. Physical science is important in the selection of a suitable medium for storing the information of this invention, be it electrical, mechanical or chemical. The invention, which actually tries to create something that will last forever, is also outside the scope of social science, which deals with behavior or decision making and, thus, requires the consideration of only the expected consequences of an action to the infinite future. In general, many important results in social science, such as decisions and prices, both of which involve the infinite future, are not empirically verifiable simply because the infinite future will never arrive. The never ending self-generation of software in this invention also involves infinity in time, and social science will be needed to consider its consequences.

In conclusion, physical science involves finite time, social science involves time to the infinite future, and life science, a field to which this invention belongs, both the infinite future and the infinite past. In terms of human progress, this invention has surpassed the current culture dominated by physical science and even the hitherto still questionable knowledge in social science; it has brought us into the field of life science, the fundamental principles of which defy materialistic interpretations, and the point of view of which seems to contradict that of physical science. This invention has entered into a very advanced area of post-scientific knowledge.

OBJECTS AND ADVANTAGES

The advantages of the completely automated software system can be understood from a comparison of the concepts in this invention and those in the existing software systems and, in particular, from the exposition of the conceptual flaws of past generations of computer software.

In a completely automated self-generating software system, all the programs are generated programs, which can be automatically documented, modified, and updated through the process of regeneration. Technically, the software system can be regenerated by feeding specification files of the programs to be generated into program generators. The specification file is simply a data file which records the exact keystrokes inputted into a specification generator. The specification file is readily understood by its corresponding generators so that the file can be automatically updated. The program generators and specification generators must themselves be generated programs with corresponding specification files. Thus, all software programs in a completely automated self-generating software system are generated programs, each with its own specification file.

The specification generator poses tree-structured multiple-choice questions to the user. The answers to these questions are recorded in the specification file. When the questions are in human language, the question and answer approach in the software system allows people without knowledge of programming to write programs. On the other hand, the program generator, the update generator, and the document generator can automatically handle the specification file created by the specification generator. Regeneration, updating, and documentation can, thus, be carried out automatically by the computer. Software will become the dominant form of knowledge only when knowledge experts without the knowledge of computer technology can interact easily with the computer and when the software produced will not become obsolete.

The requirement that all the programs in the software system are generated programs implies that one initial program or an initial group of programs must be able to generate itself. The self-generating property is the essential feature of this invention. There are two major problems in software. They can be characterized as the communication difficulty among programmers, which is the problem of insufficient documentation, and the communication difficulty among programs, which is the problem of updating and obsolescence. Specification files are used to solve these problems by permitting automatic documentation and updating. Self-generation automates software completely. Obsolescence becomes a serious problem and is always possible, even if one initial, or any, generator does not have a specification file and, thus, cannot be regenerated or updated by the computer.

What should be the design criteria of software systems? For the completely automated software system, as well as the living organism, the most important design criterion is permanence, for the value—a subject in the domain of social science—of a permanent object should be infinitely higher, or lower, than the value of a similar object with only a temporary life. Another obvious requirement for the purpose of software development is understandability, or friendliness, to the user. Here communication between the computer and its users is most preferably in the already existing human languages.

What are the design criteria of the past and present—from the first to the sixth—generations of computer languages based on which all other software programs are written? Generally, all the current software systems are only partially automated possibly because the concept of permanence, or of complete automation, has not occurred to software designers and, therefore, has not been one of their design criteria. The first generation language or software consisted of machine instructions which are difficult for users to remember. Trying to remedy the defect of the machine code, the second generation languages in the form of assemblers first introduced fifty years ago the fatally flawed concept of the source code, which is supposedly a straightforward, yet harmless, idea of mnemonic representation of the machine instructions. Automating the translation of the source code with compilers was the first step in the wrong direction for software. The compiler, corresponding to, but unlike, the program generator of the completely automated software system, is not understandable, or even visible, to the user. The generators of this invention, on the other hand, express itself in human language consisting of multiple-choice and text questions. The source code is a poor form of program documentation, and, most importantly, it is impossible to be automatically updated because the formats of the future or destination source codes are unknown.

The complete automation of software depends on automatic updating. The specification file (or DNA) can have its update or conversion program, which updates the specification file of one generator (or language) to another, be written even before the future generators are created. That is that the specification files can be automatically updated if the formats of the system always follow that of the same tree-structured multiple-choice and text questions. The conclusion that the format of the permanent information is unique is supported by the observation that the completely automated self-generating software system, which represents the most primitive form of a permanent information system, and the DNA and protein system of the living organism, which could be the most advanced permanent information system, are fundamentally similar in design. The format based on tree-structured multiplechoice questions could be the only logical interface for communication between the human and the machine. The realization that there is only one unique way to represent permanent information could be one of the most significant discoveries in knowledge, for it provides the possibility for auto-updating and, thus, the foundation for creating systems of unlimited complexity, such as those found in life science. Automatic documentation is also possible when the format is unique.

The third generation languages, such as FORTRAN, COBOL, BASIC, C, ADA, LISP, C++, etc., follow the tradition of mnemonic representations of the machine instructions and their translation to machine instructions using compilers. They also introduced the concept of dividing the computer language into the machine-independent source code and the machine-dependent compiler. The design of the source code, which was intended to make it more understandable to the user than to the machine, suffers the additional defect of using fixed keywords which require standardization, a major hindrance to software progress. The completely automated software system, on the other hand, does not require users to remember technical information, such as keywords, addresses, etc., which could become unlimited in number. Technical knowledge exists as an unnecessary barrier to the automation of knowledge. In fact, a whole industry and a new academic division have sprung up to take advantage of this original faulty design in computer software. In a technically similar, but conceptually different, design of the compiler, the completely automated software system stores almost all the technical information in an instruction generating set, which is generally transported without the need of knowing its internal structure, as ribosomes are partitioned during cell divisions, and can only be created or modified by the original manufacturer of the system.

The fourth generation languages or CASE (Computer Aided Software Engineering) attempt to make the computer communicate with users in human languages. Unfortunately, the complex human-language software systems have, thus far, defied standardization with mechanical precision. Users of CASE tools and object-oriented software systems are trapped in the standards of the companies which created them when there are no public standardization committees, which need to exist permanently to uphold the integrity of the standards. Automatic update and self-generation eliminate the necessity of software standardization.

Japan's fifth generation software, which tries to make human language understandable to the computer, has been declared bankrupt recently. Japan's sixth generation software dealing with robotics is still contradictory to the fundamental concept of permanence and to the living technology represented by the living organisms and the completely automated software system, which can be considered the last generation software and the first generation life science. In conclusion, the existing computer languages, which are based on the source code and the compiler, violate the fundamental principle of a permanent information system which requires that the machine should only be allowed to handle simple machine languages and the user should only deal with human languages. Ever since the computer language was first invented fifty years ago, it has followed the mistaken trend of making the source code increasingly understandable to the user, doing a double duty of communicating with both the computer and the user (program listing); the correct design should make the source code, as the specification file, easily controllable by the computer and the compiler, as the program generator, communicate with the user in the human language.

The completely automated self-generating software system should immediately revolutionize software, because it requires existing software to be rewritten into technology-independent, non-obsolescent, permanent software; yet, its true value will not be fully realized until our own quest to create life reveals—from our own design criteria—the purpose of our existence.

SUMMARY OF THE INVENTION

This invention deals with software which will never become obsolete. Once written, this non-obsolescent software will never need to be rewritten, for the software can be automatically updated by the computer when the computer technology changes. In fact, the non-obsolescent software programs form a complete interrelated system, which as a whole can never become obsolete.

The computer industry is thus far controlled by standards. The self-generating software system eliminates software standards through mainly auto-updating of specification files. The self-generating capability will allow software systems to be translated to any computerized human language. Thus, the entire educated population of the world will be able to used the computer without learning a dominant human language or computer technology.

Ultimately, all current non-self-generating software system should be written or rewritten as parts of permanent self-generating software systems, so that they will not need to be written again. All the high-level computer languages will gradually become unnecessary, since machine language will be generated directly. Human language is used in the specification generator for communication between the computer and users, which include software developers.

The key to the success of the self-generating software system is in separating as much as possible the problem specification from computer technology. The complete separation is made possible through self-generation. Most importantly, being possibly the first man-made item designed to last forever, the completely automated self-generating software system, corresponding to the DNA and protein system of the living organism, represents a crucial step in bridging the gap between the non-living machines of the twentieth century and the living organisms. We are so fond of the computer because it is so similar to ourselves. The self-generating cell technology will try to make the computer be more like us, extending self-generation to include self-creation, and will demonstrate the feasibility of a living technology.

The technical novel features of a completely automated self-generating software system are self-generation, auto-updating, auto-documentation, and the necessary components of a self-generating software system.

It is an object of the present invention to provide the method for constructing self-generating specification generators, self-generating program generators, auto-document generators, and a auto-update generators.

It is another object of the present invention to provide the necessary combination of software parts to achieve a completely automated self-generating software system.

Other objects and advantages of the present invention will become apparent when the invention is explained and illustrated below in actual software and system terminologies.

DETAILED DESCRIPTION OF THE PREFERRED EMBODIMENTS

Figure 1:
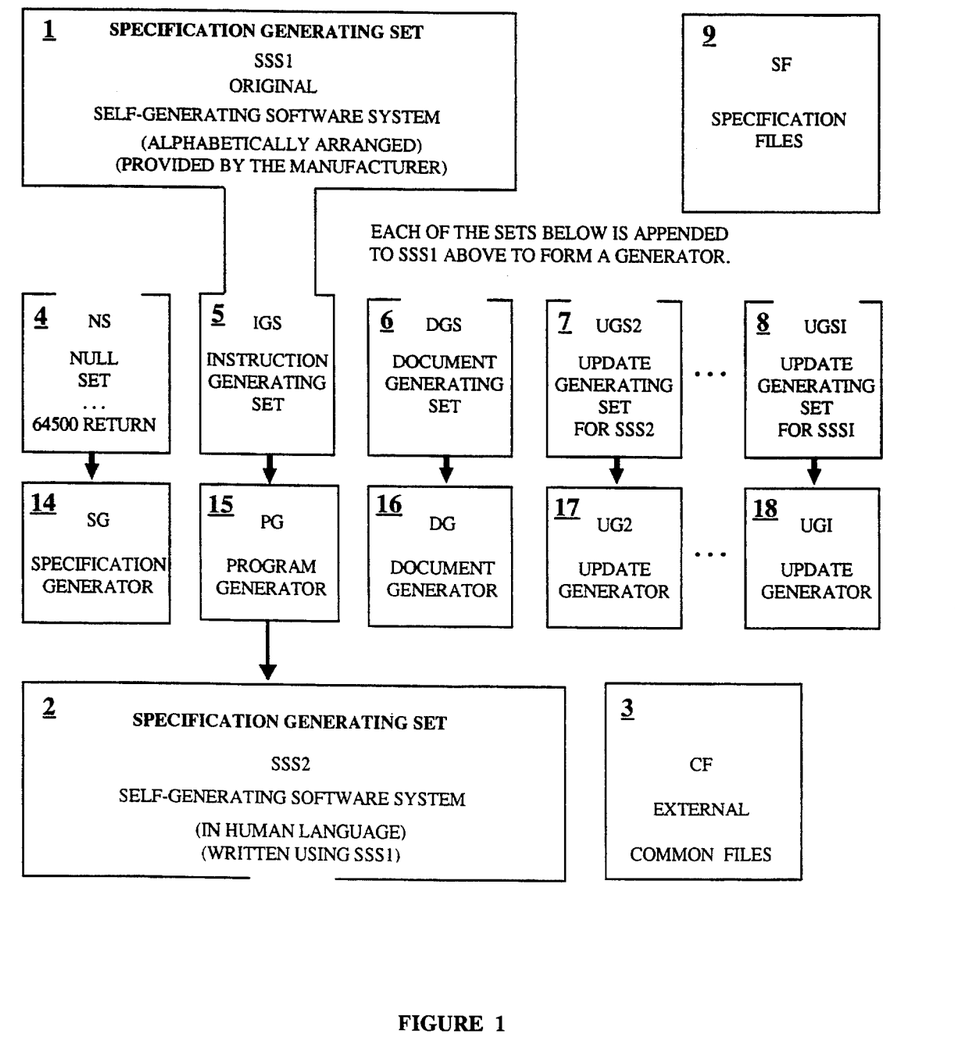
FIG. 1 is a block diagram showing an overview of the components and the interrelationship of a system exemplifying the present invention.
Figure 2:
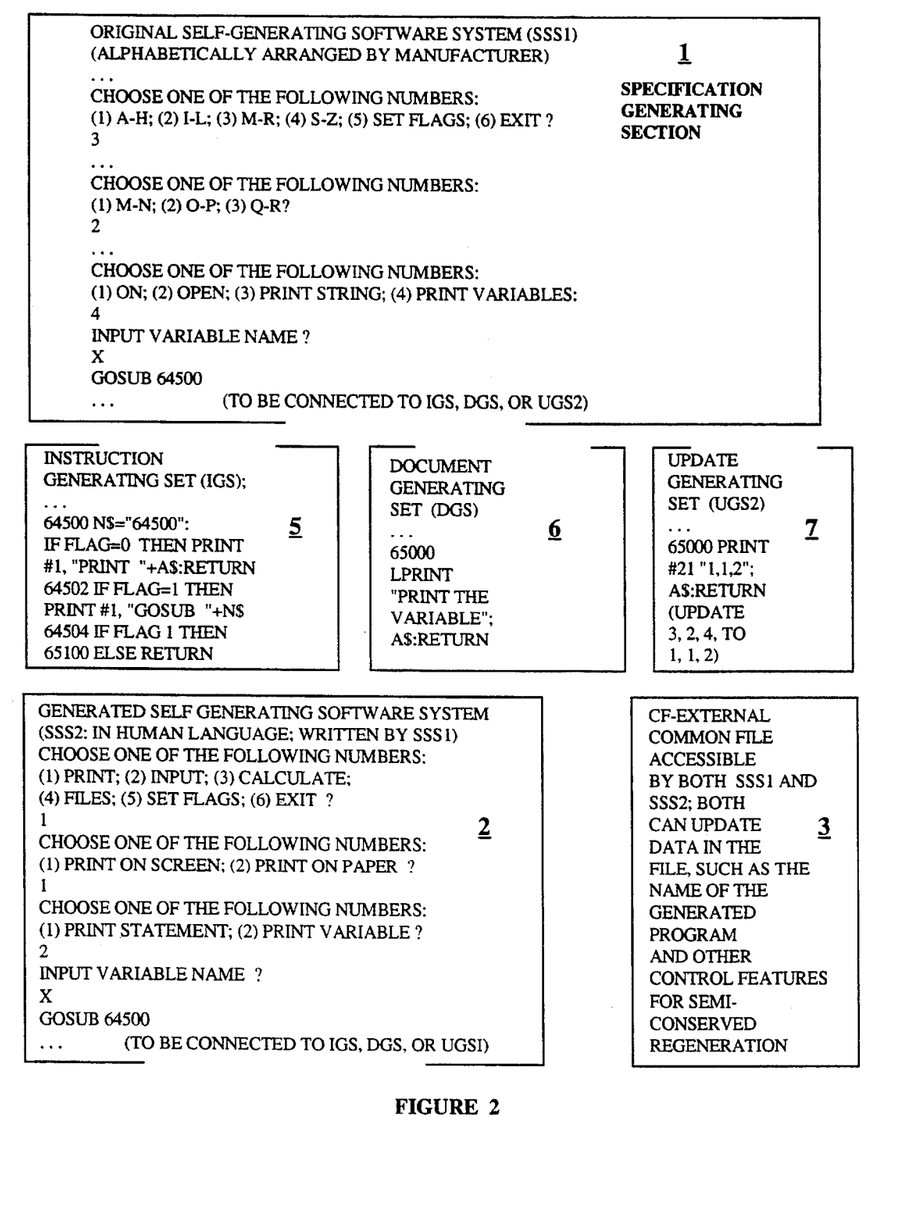
FIG. 2 is a block diagram illustrating certain essential elements of the system of FIG. 1 in the performance of some particular specification generation through answering tree-structured multiple-choice questions, program generation, specification documentation, and specification updating functions, exemplifying the primary operations of the invention.

While FIG. 2 gives the essential functions of the invention, FIGURE 1 presents an easy overview of the invention and, in particular, the relationship of all the components of the invention. They should be viewed together.

Initially, an user is provided by a manufacturer or an original software developer with an original specification generating section 1 and an instruction generating set 5. A program generator 15 can be constructed by appending the set 5 to the section 1. In addition, the user is generally provided with specification files 9 of the set 5, the generator 15, a null set 4, a document generating set 6, a updating generating set 8 or UGSi where i=1 corresponding to the section 1, and an external common file 3, which permits semi-conserved self-generation. The specification file for the section 1 is included in the generator 15, which includes, in addition to the specifications of the section 1, specifications for automatically appending the set 5 to the section 1.

In particular, the specification file 9 of the generator 15 when fed into the generator 15 will self-generate the generator 15. Similarly, the specification files 9 of the sets 4, 5, 6, and 8 will generate the sets 4, 5, 6, and 8 respectively when their specification files 9 are fed into the generator 15. A specification generator 14 can be constructed by appending the null set 4 to the section 1. Similarly, a document generator 16 and a update generator 17 can be constructed by appending respectively the sets 6 and 7 to the section 1.

The null set 4 as shown in FIG. 1 contains simple RETURN instructions which will allow the specification generator 14 to just create specification files without generating programs. The self-generating specification file of the program generator 15 will permit users to easily change the screen display of the section 1 in FIG. 2 to their own native languages or to formats which they prefer. The specifications generated by the specification generator 14 are stored in the specification file 9, which can be called by the specification generator 14 for modification, by the program generator 15 for program generation, by the document generator 16 for generating documentation, and by the update generator 17 for updating to specifications for another specification generating section, such as a generated specification generating section 2.

The document generating set 6 and the update generating sets 7 and 8 can generally be constructed by users using the program generator 15 supplied by the manufacturer, who generally also supply initial versions of the sets 6 and 8, where i=1, and/or the specification files of the sets 6 and 8.

The main functions of the self-generating software systems in FIG. 1 are illustrated in the sections 1 and 2 in FIG. 2. These functions mainly consist of posing multiple-choice questions in a tree structure, which create specifications and lead to a subroutine calling instruction, such as GOSUB 64500, calling a subroutine in the instruction generating set 5 or any of the other sets 6 and 7 in FIG. 2. The subroutine at instruction 64500 in the instruction generating set 5 in FIG. 2 will facilitate the output of a program instruction PRINT X when the FLAG is set at the default value of 0, will generate the instruction generating instruction GOSUB 64500 when FLAG has been preset to 1, and will generate instructions, such as 64500 LPRINT "LPRINT THE VARIABLE";A$:RETURN as shown, for the document generating set 6 in FIG. 2 when the FLAG has been preset to 2. The exact procedure of generating the updating generating set 7 in FIG. 2 and the proper usage of the generator 17 are somewhat involved and will be described in the following paragraph.

In FIG. 2, to generate the instruction, 64500 PRINT #2, "1,1,2";A$:RETURN, in the update generating set 7, the specification generating section 2 has to be written first using the program generator 15 made of the section 1 and the set 5. When the section 2 is combined with the set 5 and the FLAG is preset to 3, typing specifications, 1, 1, 2, Enter will generate the above instruction in the set 7. This updating capability has been constructed into the instruction generating set 5. Conceptually, it is very important for understanding this invention to note that the information of the address number 64500 (Note: N$="64500" in instruction 64500 of set 5) and the specifications 1, 1, 2 are all available for constructing the updating instruction 64500 PRINT#2, "1,1,2";A$:RETURN by the set 5. The update generator 17 in FIG. 1 is constructed for updating specification files for the original (or any other) specification generating section 1 to the specification files for the generated section 2. The proper procedure for updating from section 1 to section 2 is to append the update generating set 7 to the section 1 (or any other section except 2), since only the source section 1 can understand the source specification, such as 3, 2, 4, X as shown in section 1. In particular, it should also be of great practical interest to realize that the self-generating specification file for section 2 can be obtained by automatically updating the specification file created by the section 1 to the specification file for section 2 using the update generator 17 consisted of the section 1 and the set 7. In other words, once the new section 2 is written using the generator 15 made of the section 1 and the set 5, there is no need to rewrite the self-generating specification file for section 2 using the new generator formed by the section 2 and the set 5.

Both generators 15 for sections 1 and 2 can self-generate. However, to self-generate semi-conservatively (i.e. with some alteration from the parents), the external common file 3 is needed. It is initially provided by the manufacturer but can be easily, and creatively, modified or constructed by the user. The ramifications of semi-conserved self-generation, such as evolutionary regeneration, mutation, differentiation, etc., is beyond the scope of this invention, but could offer some of the most rewarding areas for future research.

Figure 3:
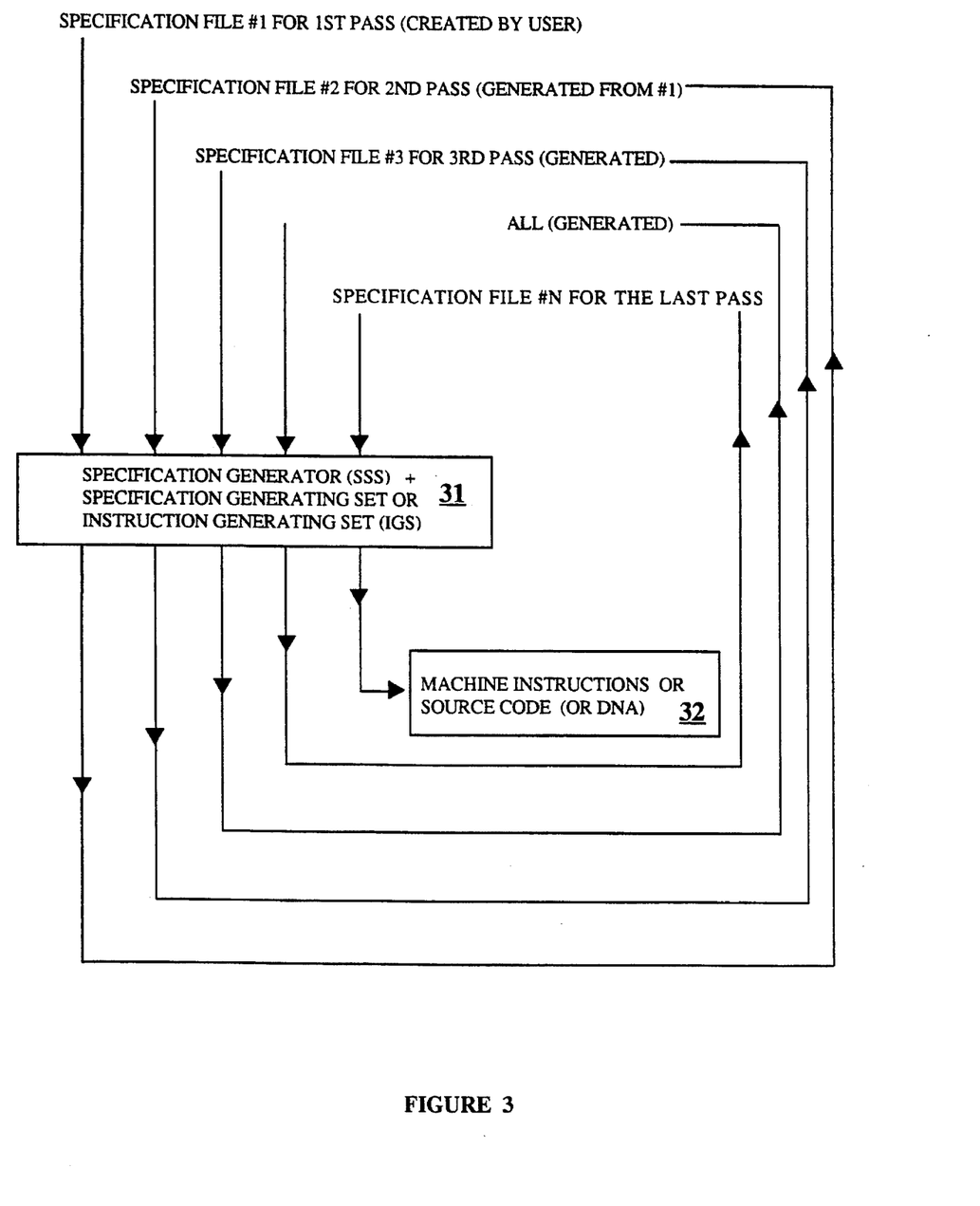
FIG. 3 is a flow diagram showing the multiple-pass generation from multi-level specification files, passing through specification and program generator to generate programs in machine instructions or source code, exemplify the multi-level nature of the invention.

The description of the structure and the functions of a completely automated self-generating software system must include the multiple-pass generation and the multi-level documentation and update of specifications. Examples of different levels of representation are objects in object-oriented programming, reusable subroutines or functions, macro problem specifications, source codes, and machine codes, etc. with machine codes being the lowest level of representation. As illustrated in FIG. 3, high-level codes must pass through the specification generator plus specification generating set or instruction genera thug set 31 to finally be reduced down to the lowest level represented by, for example, machine or source code (or DNA) as shown in 32 of FIG. 3. The specification generators in generator 31 are created by the user patterning after the structure of the instruction generating set 5 of FIG. 2. Here the specification file for the instruction generating set 5 from the manufacturer of the system could be of great help. The program generation described by systems 31 and 32 are top down. As shown in FIG. 3, only specification file #1 is created by the user; the specification files at all other levels are generated.

The documentation of the specification files at any level of representation can be in any order, top down, bottom up or mixed. The updating of the specification files is bottom up and is automatic. Auto-updating involves the creation of new updating generators. The auto-update programs are automatically created. First, the self-generating specification file for the old generator is updated to the new generator. Then, the specification files for all the other application programs, functions, modules, macro codes, reusable codes, objects, etc. for the old generator are updated. The operation of the multi-level system will follow the same principles as that of the single-level system outlined above in this invention.

Figure 4:
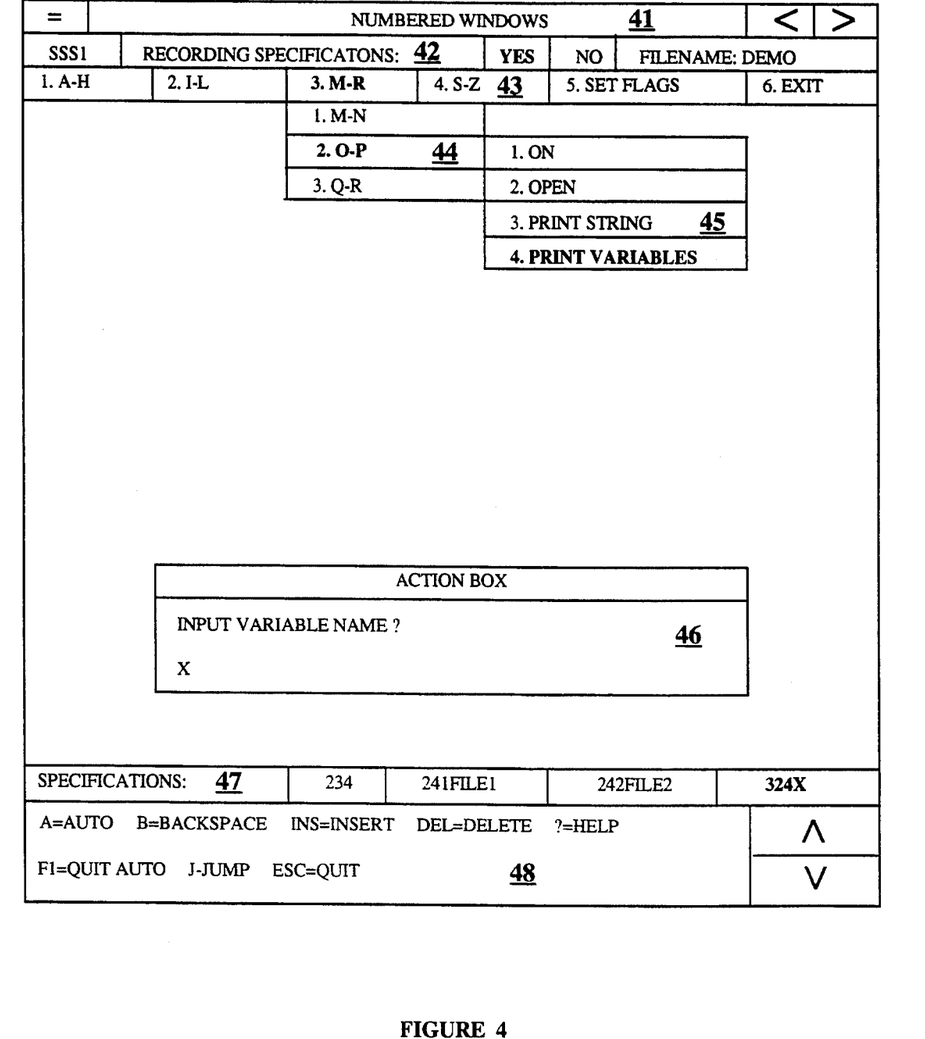
FIG. 4 is a sample user interface and a prototyper for developing user interfaces showing the tree-structured multiple-choice questions in a windows format allowing alternative modes of input, such as mouse clicking, touch screen pointing, and voice, exemplifying a preferred user interface of this invention.

FIG. 4 shows the original specification generator section 1 in FIG. 2 in its windows format. At the top of the windows display, the first line 41 shows the words NUMBERED WINDOWS, which is an appropriate name for this type of windows, since here all the choices in the windows are numbered. The second line 42 shows SSS1 as the name of the specification generating section 1, whether the specification is being recorded or not, and DEMO, the file name under which the specification file is being saved. The third line 43 is first of the three layers of the tree-structured multiple-choice questions. Under 3. M-R on line 3 is the pull-down second multiple-choice question 44 displayed vertically after 3 is chosen for the first question. After 2 is chosen for the second question, the third multiple-choice question 45 is shown as a pull-right vertical display.

The lower half or FIG. 4 shows the Action Box 46, which poses text question(s). It should be noted that in order for the automatic handling by the computer, the answers to the text questions are treated as items without regard to their internal structures. Below the ACTION BOX 46 is the display 47 of the inputted specifications, the most recent of which is at the most right. The bottom two lines shows the abbreviated explanations of the available editing features for the system SSS1. Due to the self-generating capability of SSS1, FIG. 4 can also be considered a prototyper for developing user interfaces in a windows format which will allow alternative modes of input, such as mouse clicking, touch screen pointing, and voice, etc.

The novel and subtle points of the internal working of the systems, generators, files, and sets, etc. of this invention are further illuminated by actual codes in the BASIC computer language. It should be noted that although this invention exposes the fatal flaws in source code and compiler systems of computer languages, the source codes in this invention will be treated as machine codes because through self-generation the source codes will become invisible to the user. The BASIC language, being English-like and an interpreter, which simulates machine instructions, provide a useful bridge between the current software systems and the completely automated software system, since the background operation is totally transparent to the user. In general, self-generation can make not only any computer language, but also any self-generating program generator in this invention invisible to the user. The capability to eliminate any technological information or any undesirable features through self-generation is also responsible in making all computer languages equivalent to the machine language, which is an acceptable, but tedious, format for this invention.

A computer program is a set of instructions to the computer. A program is written here by answering a series of multiple-choice and text questions, which are structured like a tree. For example, the first multiple-choice question may be:
*(1) Print and Input; (2) Calculate; (3) Branching; (4) Files; (5) Special features; (6) Exit?

Typing a number will bring the user to the next multiple-choice question (These questions can be modified by the user due to the self-generating capability of the program.). The answers to these questions (or the exact keystrokes) are the specifications and are recorded in specification files, which can be used later.

The following is a sample of the program instructions in BASIC used to construct the system:
1 OPEN "O",I,"SAMPLE. BAS"
2 FLAG=O:REM FLAG=O is for genera thug an instruction. FLAG=1 is for generating an instruction generating instruction.
3 INSTRUCTION_NUMBER=INSTRUCTION_NUMBER+1:INSTRUCTION_NUMBER$=STR$(INSTRUCTION_NUMBER)
4 PRINT"*(1) Print and Input; (2) Calculate; (3) Branching; (4) Files; (5) Set flag for generating instruction generating instruction; (6) Exit?"
6 INPUT A
8 ON A GOTO 10000,20000,30000,40000,50000,60000
10000 PRINT "(1) Print a statement on screen; (2) Print a statement on paper; (3) Input into a variable?"
10004 INPUT A
10006 ON A GOTO 11000,12000,13000
11000 PRINT "(1) Print a statement on screen with a carriage return; (2) Print a statement on screen without a carriage return; (3) Print a blank line on screen?"
11004 INPUT A
11006 ON A GOTO 11100,11200,11300
11100 PRINT "What is your statement?"
11102 INPUT A$
11104 GOSUB 62000
11106 GOTO 2
50000 FLAG=1
50002 GOTO 4
60000 CLOSE: CHAIN "SAMPLE.BAS": END
62000 IF FLAG=0 THEN PRINT #1,INSTRUCTION_NUMBER$+"PRINT"+A$ ELSE PRINT #1, INSTRUCTION_NUMBER$+"GOSUB 62000"
62002 RETURN The above instructions are mostly self-explanatory, if the reader is familiar with BASIC. They are just parts of the complete self-generating program. The technical details are further explained in the following.

In the above sample program, the user can generate a instruction to print an instruction ("test") on the screen with a carriage return by typing the specifications 1, (Enter), 1, (Enter), 1, (Enter), test, (Enter). The user can alternatively generate an instruction generating instruction (GOSUB 62000) by typing the specifications 5, (Enter), 1, (Enter), 1, (Enter), 1, (Enter), (Enter); the instruction generating instruction GOSUB 62000 can self-generate a GOSUB 62000 when the FLAG is preset to 1. The above specifications will generate a BASIC program SAMPLE.BAS after the user exits the program generator by typing in 6, (Enter):
1 PRINT "test"
2 GOSUB 62000
which can be executed directly from the program generator and, thus, never needs to be seen by the user. This example demonstrates that the user does not need to remember the technologies represented by the keyword, PRINT, and the address 62000, whose number theoretically could be unlimited. All the multiple-choice and text questions in the program generator are in human language, be it English, Chinese, German, Korean, etc.

Instructions 62000 and 62002 represent a small section of the whole instruction generating set, which is provided by the manufacturer, invisible to the user and generally transported without the need to know its contents. Here, it is shown that when the FLAG is set to 0, the instruction, 1 PRINT "test", is generated, and when the FLAG is 1, the instruction generating instruction, 2 GOSUB 62000, is generated. Furthermore, since the specifications are easily handled by the computer, the software system can write its own update and documentation programs by automatically constructing the update generating set and the document generating set, which can replace the instruction generating set of the program generator to produce respectively the update (or conversion) generator and the document generator.

For example, an update program can be constructed by replacing instruction 62000 through merging or chaining by 62000 PRINT #1, 3, 7, 1, A$
which is just one instruction of the entire update generating set and where 3, 7 and 1 are the specification for generating the PRINT instruction in a new program generator, which is equivalent to a new computer language. Then, the old specifications for the old generator when being fed into this update program can be automatically converted or updated to the specifications of the new generator. The update generating set can generally be constructed automatically by the software system. Similarly, when the instruction generating set or the instruction 62000 is replaced through merging or chaining by the documentation generating set or the instruction
62000 LPRINT "Print the statement";A$;"on the screen."

the program generator has been converted to a document generator, which explains the meaning of the old specifications 1, 1, 1, and A$, or the new specifications 3, 7, 1 and A$. The document generating set is not unique and can be provided by the original manufacturer of the system, or more likely, the user. The source code is inadequate as a program documentation. The document generating set can even take into consideration program logic and objectives and, therefore, is far more flexible and effective than the source code. The importance of documentation can be seen from the fact that modem life science deals primarily with the documentation of the DNA sequences.

A program instruction of a software program is generated by calling a subroutine which can print a program instruction or instructions into the file for storing the program to be generated. This instruction generating feature is already commonly known in program generators and is not a novel feature of this invention. The following example given in BASIC language will generate the instruction 100 PRINT X.
10 GOSUB 1000
1000 PRINT #1, "100 PRINT X"
1010 RETURN

The way to generate an instruction generating instruction is by calling a subroutine (instructions 2000–2010 below) which can print a subroutine calling instruction (GOSUB 10000) into the file for storing the program to be generated. The combination of instructions for generating a program instruction which can generate an instruction is a novel feature of the self-generating software system and can be illustrated in BASIC as the following:
20 GOSUB 2000
1000 PRINT #1, "100 PRINT X"
1010 RETURN
2000 PRINT #1, "10 GOSUB 1000"
2010 RETURN

The above instruction numbers 1000 and 2000 must be prespecified, but will never need to be known by users. Once the self-generating system has been setup, instruction 2000 can be called from the generating program to generate instruction 10 in the previous example, which in turn can be used to generate instruction 100.

The set of subroutines which can generate other instructions (instructions within PRINT #1) are kept together and are to be transported from programs to programs through selective copying, chaining, and/or merging instructions. This is a novel feature in the self-generating software system and can be illustrated rising BASIC as the following:
2 CHAIN MERGE "INSTRUCTION_GENERATING_SET, 1000, 10000"
which can be transported to the generated program by calling the subroutine 3000 by instruction 40 as in the following:
40 GOSUB 3000
3000 PRINT #1, "2 CHAIN MERGE"+CHR$(34)+"INSTRUCTION_GENERATING_SET"+CHR$(34)+", 1000, 10000"
3010 RETURN
where CHR$(34) represents a quotation mark inside the real quotation marks, and the file "INSTRUCTION_GENERATING_SET" contains the set of instruction generating subroutines, which occupies instruction numbers 1000 to 10000.

To summarize the system components, the features needed for selfgeneration are program instructions, instructions which can call instruction generating subroutines, instruction which can call subroutines which can generate instructions which can call subroutines in the program being generated, the set of instruction generating subroutines, and instructions for transporting and/or generating the above set of instruction generating subroutines. Additionally, the self-generating software system consists of specification generators, program generators, update generators, document generators, application programs, utility programs, external common files, and specification files for all the programs and generators with the possible exception of the instruction generating set, the section of a program generator containing the set of instruction generating subroutines, which are represented by instructions 1000 to 10000 in the above example.

Mother essential requirement in a self-generating software system is that the instruction generating set in the program generator must contain the full machine instruction set (and other useful subroutines) for self-generation. This property of self-generation, in which a complex whole system containing the full machine instruction set generates another equally complex whole system, is novel and unique among man-made objects. It can be described as self-generating cell technology The self-generating cell is as complex as the whole generated system, which is originated from the cell. In self-generating software cell, all the programs are generated by feeding specification files, which are created by specification generators, into program generators. Containing problem specification, the specification file is designed to be independent of technology and is intended to last forever.

The concept of the self-generating cell enables multicellular design, which through semi-conserved self-generation of the cell with the help of external common files can multiply complexity by many orders of magnitude to form, for example, a self-generating artificial neural network or an electronic brain.

Finally, the whole self-generating system should be able to switch automatically among different computing levels. Examples of computing levels are the machine, the operating system, the computer language, and the application levels. When the whole system can switch freely among these levels, the user need not know how to switch computing levels during operation and, thus, is spared having to learn this particular aspect of the current computer technology.

There does not seem to be any patented prior art software systems which will never become obsolete. It appears that the completely automated self-generating software system and the objects which it tries to achieve are original and novel.

It should be apparent from the foregoing description of the invention, in the form of the self-generating software system or cell, that it will fulfill all the objects attributable thereto, and the invention shall not be limited to software. The invention could be applied to hardware, firmware, and/or software combinations. While the preferred embodiments of the invention have been illustrated and described, it is to be understood that the actual hardware, firmware and/or software system is not limited to the precise illustrations herein disclosed and the right is reserved to all changes and modifications coming within the scope of this completely novel invention as defined by the appended claims.

I claim:

1. A completely automated, technology-independent, non-obsolescent, self-generating software, firmware, and/or hardware system or cell, which can self-generate equally complex systems or cells, comprising:

an initial program generator made of an instruction generating set appended to an initial specification generating section, specification files, which record the exact keystrokes inputted when answering, preferably human-language, tree-structured multiple-choice and text questions posed by said program generator;

means for generating said initial program generators, said instruction generating set, a null set, a document generating set, an update generating set for updating specification files to the said initial program generator, and an external common file, when the corresponding said specification files are fed into said initial program generator;

means for automatically creating new specification generating sections, program generators, document generating sets, updating generating sets, common files by said initial program generator;

means for self-generation of program generators, thus, allowing users to modify the generators according to their own desires, in particular, making the generators to communicate with users in their native human languages;

means for semi-conserved self-generation with the aid of external common files by self-generating program generators;

means for automatically appending said null set, said instruction generating set, document generating sets, and update generating sets to program generators;

means for automatically switching among different computing levels; and means for multiple pass program generation from multi-level specification files and for documentation and update of multi-level specification files.

2. The system or cell of claim 1 wherein said instruction generating set being technology-dependent and containing all the necessary technology-dependent information of the system or cell, but being always usable, particularly during self-generation, auto-documentation, and auto-updating, without the necessity of the internal contents of the said instruction generating set being visible to users.

3. The system or cell of claim 1 wherein said instruction generating set having the capability of enabling program generators to preset a flag to direct the self-generation of an instruction generating instruction, which is a subroutine calling instruction and is capable of generating instructions in generated program generators, without the necessity for users to know any technical information, such as the addresses of the generating subroutines, formats of instructions, etc. in said instruction generating set.

4. The system or cell of claim 1 wherein said instruction generating set having the capability of enabling program generators to preset flags to direct the generation of-document generating sets and update generating sets, and to direct the automatic appending through chaining, merging, and/or copying of said null set, said instruction generating set, document generating sets, or update generating sets to program generators, without the necessity for users to know any technical information.

* * * * *